(12) United States Patent
Ohta

(10) Patent No.: US 9,819,281 B2
(45) Date of Patent: Nov. 14, 2017

(54) POWER CONVERSION CONTROL DEVICE

(71) Applicant: DAIKIN INDUSTRIES, LTD., Osaka-shi, Osaka (JP)

(72) Inventor: Keisuke Ohta, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/316,922

(22) PCT Filed: Jun. 15, 2015

(86) PCT No.: PCT/JP2015/067126
§ 371 (c)(1),
(2) Date: Dec. 7, 2016

(87) PCT Pub. No.: WO2015/194493
PCT Pub. Date: Dec. 23, 2015

(65) Prior Publication Data
US 2017/0117816 A1    Apr. 27, 2017

(30) Foreign Application Priority Data

Jun. 19, 2014  (JP) .................. 2014-126108

(51) Int. Cl.
*H02M 5/458*    (2006.01)
*H02M 1/14*    (2006.01)
(Continued)

(52) U.S. Cl.
CPC .............. *H02M 5/458* (2013.01); *H02M 1/12* (2013.01); *H02M 1/14* (2013.01); *H02P 6/14* (2013.01);
(Continued)

(58) Field of Classification Search
CPC .. H02M 2001/0012; H02M 1/12; H02M 1/14; H02M 5/458; H02M 5/4585; H02M 7/525

See application file for complete search history.

(56) References Cited

U.S. PATENT DOCUMENTS 7,907,427 B2    3/2011  Sakakibara et al.
2005/0254265 A1*  11/2005  Yamada ................ H02M 3/156
                                                             363/13

(Continued)

FOREIGN PATENT DOCUMENTS

JP    4067021 B2    3/2008
JP    4750553 B2    8/2011

OTHER PUBLICATIONS

International Search Report for PCT/JP2015/067126 (PCT/ISA/210) dated Sep. 8, 2015.

*Primary Examiner* — Fred E Finch, III
(74) *Attorney, Agent, or Firm* — Birch, Stewart, Kolasch & Birch, LLP

(57) ABSTRACT

A voltage period calculator obtains an oscillation period of a voltage. A power source impedance estimating unit obtains an estimated value of a power source impedance from the oscillation period, an inductance, and a capacitance. A gain setting unit sets a control gain using the estimated value, the inductance, the capacitance, and a desired attenuation coefficient command, and outputs the control gain. A multiplier obtains a product of the control gain and the voltage. A subtractor subtracts the product from a command value to obtain a voltage control ratio command.

7 Claims, 11 Drawing Sheets

(51) Int. Cl.
*H02M 1/12* (2006.01)
*H02P 27/08* (2006.01)
*H02P 6/14* (2016.01)
*H02M 1/00* (2006.01)

(52) U.S. Cl.
CPC ..... *H02P 27/08* (2013.01); *H02M 2001/0012* (2013.01)

(56) References Cited

U.S. PATENT DOCUMENTS

| | | | | |
|---|---|---|---|---|
| 2009/0085510 | A1* | 4/2009 | Pande | H02M 1/4216 318/729 |
| 2014/0328092 | A1* | 11/2014 | Yokokawa | H02M 7/53875 363/41 |
| 2015/0256095 | A1* | 9/2015 | Ohta | H02M 7/4826 363/37 |
| 2016/0359423 | A1* | 12/2016 | Ohta | H02M 1/12 |
| 2017/0012471 | A1* | 1/2017 | Misawa | H02J 50/10 |
| 2017/0077829 | A1* | 3/2017 | Taniguchi | H02P 23/26 |

\* cited by examiner

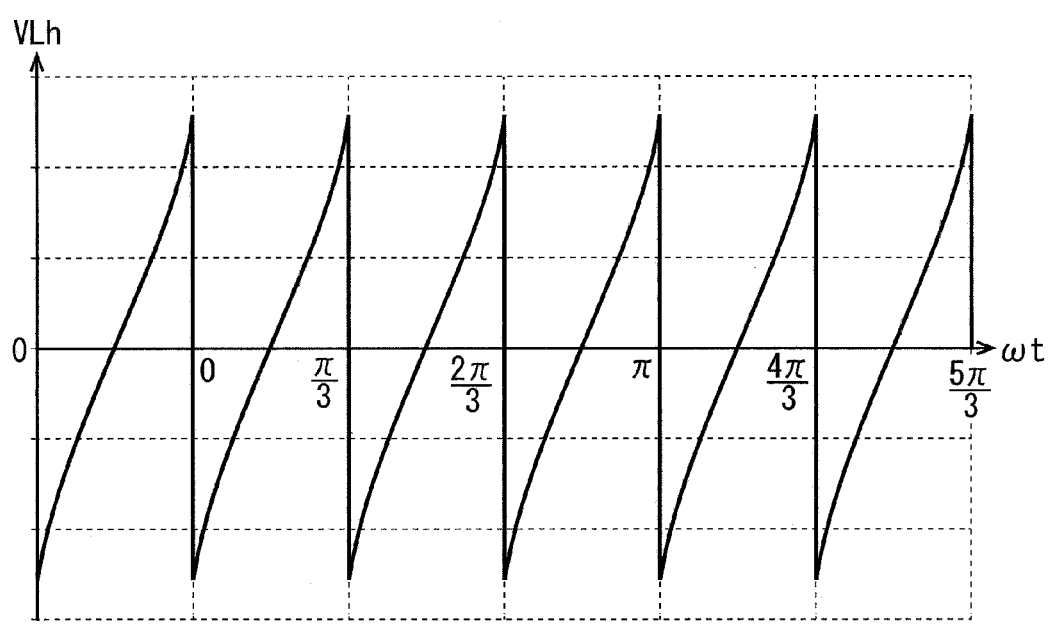
F I G. 2 4

POWER CONVERSION CONTROL DEVICE

TECHNICAL FIELD

The present invention relates to a technique for controlling a power converting apparatus. The controlling technique is applicable to, for example, controllers for capacitor-less inverters to be described later.

BACKGROUND ART

Japanese Patent No. 4067021 describes a motor controller. The motor controller includes a rectifying unit and an inverter. The rectifying unit and the inverter are mutually connected through a DC link. The rectifying unit receives an AC voltage, converts the AC voltage into a DC voltage using a full-wave rectification, and outputs the DC voltage to the DC link. The inverter receives the DC voltage, converts the DC voltage into an AC voltage, and outputs the AC voltage to a motor.

The DC link includes an LC filter including a reactor and a capacitor. More specifically, the capacitor and the reactor are connected in series with each other between a pair of output ends of the rectifying unit. Then, a voltage across the capacitor is input to the inverter as a DC voltage. The capacitance of the capacitor is smaller than those of generally-called smoothing capacitors. The voltage across the capacitor has a ripple component caused by the full-wave rectification. As such, when the capacitance of the capacitor included in the DC link is smaller, the DC link as well as the rectifying unit and the inverter that are coupled through the DC link are sometimes collectively referred to as a "capacitor-less inverter".

In Japanese Patent No. 4067021, the inverter is controlled on the basis of a voltage across the reactor to reduce a harmonic component, which is caused by the resonance of the LC filter, of a DC voltage. For example, an initial value of a voltage control ratio of the inverter is corrected by subtracting from the initial value a product of the voltage across the reactor and a gain to calculate a target value of the voltage control ratio. Then, a control signal for the inverter is generated on the basis of this target value of the voltage control ratio and a voltage command value calculated using a known method. Accordingly, the harmonic component of the voltage across the capacitor is reduced, and furthermore, distortions of the current input to the motor controller are reduced. Such a control based on the voltage of the reactor is also referred to as a VL control system in the present application.

Japanese Patent No. 4750553 proposes a technique for suppressing the resonance of a DC voltage to be input to an inverter on the basis of a voltage across a capacitor.

SUMMARY OF INVENTION

Problems to be Solved by the Invention

The VL control system introduced by Japanese Patent No. 4067021 determines a control gain using the inductance of the reactor and the capacitance of the capacitor, where the reactor and the capacitor form the LC filter.

However, in reality, a power source to be connected to the motor controller also has an impedance (this impedance will be hereinafter referred to as a "power source impedance"). The power source impedance differs depending on a region or a place where the motor controller is connected. Thus, in the VL control system, differences in power source impedance may vary a voltage at the DC link, that is, an input voltage to the inverter, and accordingly, may alter the control characteristics. Such alteration becomes noticeable, particularly when the inductance component of the power source impedance is larger.

The present invention has been conceived in view of the above problems, and the object thereof is to maintain at a desired value an attenuation coefficient of variations in voltage at the DC link, irrespective of the magnitude of the impedance on a side of the power source.

Means to Solve the Problems

A power conversion control device (3) according to the present invention controls a power converting apparatus. The power converting apparatus includes: a pair of power supply lines (LH, LL); a capacitor (C1) provided between the pair of power supply lines; a reactor (L1) that forms, with the capacitor, an LC filter (8) that is a choke-input filter; a rectifying unit (1) that rectifies a first AC voltage to be input from a power supply (E1) into a DC voltage to output the DC voltage to the LC filter; and a power converting unit (2) that converts, on the basis of a switching signal (S), a voltage across the capacitor (VC) into a second AC voltage.

The power conversion control device according to the present invention includes: a gain setting unit (313A, 313B) that sets a control gain (k) on the basis of an attenuation coefficient command ($\zeta z$) that is a command value of an attenuation coefficient ($\zeta cal$) of one of a voltage across the reactor (VL), a current (IL) input to the reactor, and the voltage across the capacitor; a voltage control ratio command generating unit (32) that corrects a command value (K**) of a voltage control ratio by subtracting a product of the control gain and the one (W2) of the voltage across the reactor, the current (IL) input to the reactor, and the voltage across the capacitor to output a voltage control ratio command (K*), the voltage control ratio being a ratio of an amplitude of the second AC voltage to an average of the voltage across the capacitor; and a switching signal generating unit (33) that generates the switching signal on the basis of the voltage control ratio command.

A first aspect of the power conversion control device according to the present invention further includes a power source impedance estimating unit (312) that obtains an estimated value (Z^) of an impedance on a side of the power source viewed from the rectifying unit. The gain setting unit (313A) sets the control gain (k) using the estimated value, an inductance (L) of the reactor (L1), a capacitance (C) of the capacitor (C1), and the attenuation coefficient command ($\zeta z$). The voltage control ratio command generating unit (32) subtracts from the command value (K**) a product of the control gain and the voltage across the reactor (VL) to output the voltage control ratio command (K*).

A second aspect of the power conversion control device in the first aspect according to the present invention further includes a voltage period calculator (311) that calculates an oscillation period ($\tau$) of the one of the voltage (VL) across the reactor (L1), the current (IL) input to the reactor, and the voltage (VC) across the capacitor (C1). Then, the power source impedance estimating unit (312) obtains at least an inductance component (l) of the estimated value (Z^) from the oscillation period, the inductance (L), and the capacitance (C). The gain setting unit (313A) sets the control gain (k) using the at least inductance component of the estimated value, the capacitance, and the attenuation coefficient command ($\zeta z$).

In a third aspect of the power conversion control device in the second aspect according to the present invention, the power source impedance estimating unit (312) further obtains a resistance component (r) of the estimated value (Ẑ) from a line-to-line voltage (VS) of the power supply (E1), the voltage (VL) across the reactor (L1), the voltage (VC) across the capacitor (C1), the current (IL) that flows through the reactor, and the inductance component (l) of the estimated value (Ẑ). The gain setting unit (313A) sets the control gain (k) using the inductance component and the resistance component of the estimated value, the capacitance (C), and the attenuation coefficient command (ζz).

A fourth aspect of the power conversion control device according to the present invention further includes an attenuation coefficient solution circuit (310) that obtains the attenuation coefficient (ζcal) of a measuring object (W1) that is the one of the voltage (VL) across the reactor (L1), the current (IL) input to the reactor, and the voltage (VC) across the capacitor (C1). The gain setting unit (313B) sets the control gain (k) on the basis of a deviation (Δζ) obtained by subtracting the attenuation coefficient from the attenuation coefficient command (ζz). The voltage control ratio command generating unit (32) corrects the command value (K**) by subtracting a product of the control gain and the measuring object to output the voltage control ratio command (K*).

In a fifth aspect of the power conversion control device in the fourth aspect according to the present invention, the first AC voltage (VS) has three phases, and the attenuation coefficient (ζcal) of the measuring object is obtained by removing a sixth-order harmonic component of a frequency of the first AC voltage of the measuring object.

In a sixth aspect of the power conversion control device in the fifth aspect according to the present invention, the attenuation coefficient solution circuit (310) includes: a peak value detection circuit (314) that detects a pair of local maximum values (a(j), a(j+m)) of the measuring object (W1); and an attenuation coefficient calculation circuit (316) that performs calculations to obtain a logarithmic decrement (δ) of the measuring object from an integer (m) and a ratio of the pair of local maximum values and obtain the attenuation coefficient (ζcal) from the logarithmic decrement, the integer being larger by 1 than the number of other local maximum values between the pair of local maximum values.

Effects of the Invention

The power conversion control device according to the present invention maintains at a desired value an attenuation coefficient of variations in voltage to be input to the power converting unit, irrespective of the magnitude of an impedance on a side of a power source.

According to the first aspect of the power conversion control device of the present invention, a voltage control ratio command with consideration given to the magnitude of the impedance on the side of the power source is obtained.

According to the second aspect of the power conversion control device of the present invention, an inductance component of an estimated value of the impedance on the side of the power source is obtained.

According to the third aspect of the power conversion control device of the present invention, a resistance component of the estimated value of the impedance on the side of the power source is also obtained.

According to the fourth aspect of the power conversion control device of the present invention, an attenuation coefficient of variations in voltage to be input to the power converting unit is maintained at a desired value without estimating the impedance on the side of the power source.

According to the fifth aspect of the power conversion control device of the present invention, an attenuation coefficient is accurately obtained with little influence of ripples caused by the rectification by the rectifying unit.

According to the sixth aspect of the power conversion control device of the present invention, an attenuation coefficient is obtained from a logarithmic decrement.

The objects, features, aspects and advantages of the present invention will become more apparent from the following detailed description and the accompanying drawings.

BRIEF DESCRIPTION OF DRAWINGS

FIG. 24 is a graph representing a waveform of a voltage across the reactor when an oscillation caused by resonance does not occur.

DESCRIPTION OF EMBODIMENTS

1. Configuration of Power Converting Apparatus

Figure 1:
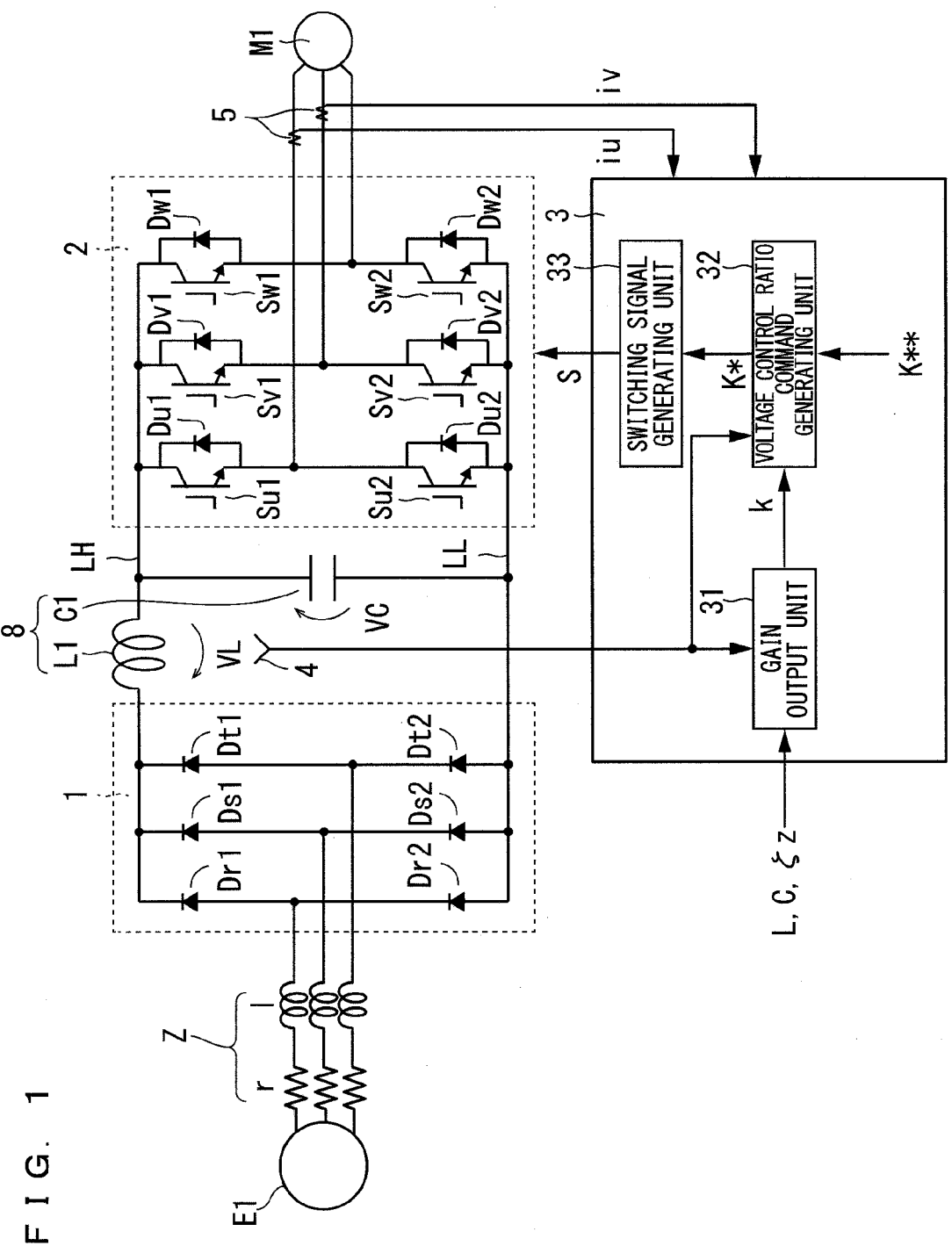
FIG. 1 is a circuit diagram exemplifying a configuration of a power converting apparatus to be used in first and second embodiments.

FIG. 1 is a circuit diagram exemplifying a schematic configuration of a power converting apparatus to be used in the following embodiments. The power converting apparatus includes a pair of power supply lines LH and LL, an LC filter 8, a rectifying unit 1, and a power converting unit 2.

The LC filter 8 includes a capacitor C1 and a reactor L1. The capacitor C1 is provided between the power supply lines LH and LL. The reactor L1 forms, with the capacitor C1, the LC filter 8 that is a choke-input low-pass filter.

The rectifying unit 1 converts an N-phase AC voltage (N is a positive integer) to be input from an AC power supply E1 into a DC voltage, and outputs the DC voltage to the LC filter 8. In the example of FIG. 1, the rectifying unit 1 is a diode rectifier circuit.

The rectifying unit 1 is not limited to the diode rectifier circuit but may be another AC-DC converter that converts an AC voltage into a DC voltage. For example, a thyristor bridge rectifier circuit or a pulse-width-modulation (PWM) AC-DC converter can be used as the rectifying unit 1.

Furthermore, the rectifying unit 1 is a three-phase rectifier circuit to which a three-phase AC voltage is to be input in the example of FIG. 1. However, the number of phases of an AC voltage to be input to the rectifying unit 1, that is, the number of phases of the rectifying unit 1 is not limited to three but may be appropriately set.

The power converting unit 2 is, for example, a voltage-source inverter, and receives a DC voltage (voltage across the capacitor C1) VC between the power supply lines LH and LL. Then, the power converting unit 2 converts the voltage VC into an AC voltage on the basis of a switching signal S from a power conversion control device 3, and outputs the AC voltage to a load M1. Hereinafter, the AC voltage to be output by the power converting unit 2 will be also referred to as an output voltage.

In FIG. 1, the power converting unit 2 includes, for example, three-phase pairs of switching units that are mutually connected in series between the power supply lines LH and LL. In the example of FIG. 1, each of a pair of switching units Su1 and Su2, a pair of switching units Sv1 and Sv2, and a pair of switching units Sw1 and Sw2 is connected in series between the power supply lines LH and LL. Then, a connection point between a pair of switching units Sx1 and Sx2 (x represents u, v, and w and the same holds true for the following) in each of the phases is connected to the load M1.

The power converting unit 2 converts the voltage VC into a three-phase AC voltage and outputs the AC voltage to the load M1, by appropriately bringing the switching units Sx1 and Sx2 into or out of conduction on the basis of the switching signal S. Accordingly, a three-phase AC current flows through the load M1.

For example, a rotating machine (such as an induction machine or a synchronous machine) is used as the load M1. Furthermore, although FIG. 1 exemplifies the three-phase load M1, the number of phases is not limited to such. In other words, the power converting unit 2 is not limited to a three-phase power converting unit.

The power supply lines LH and LL function as a DC link that couples the rectifying unit 1 and the power converting unit 2. Although the LC filter 8 is placed in this DC link, it does not need to have a function of smoothing a voltage to be input to the power converting unit 2, that is, the voltage VC across the capacitor C1. In other words, the LC filter 8 may allow ripples of the voltage rectified by the rectifying unit 1.

Specifically, the voltage VC has a ripple component caused by the rectification of the N-phase AC voltage (for example, a ripple component having a frequency obtained by multiplying the frequency of the N-phase AC voltage by 2N using the full-wave rectification: hereinafter, the frequency of the ripple component may be referred to as a ripple frequency). In the example of FIG. 1, the voltage VC ripples at a frequency six times a frequency of the three-phase AC voltage that has undergone the full-wave rectification. Specifically, the ripple component is a sixth-order harmonic component of the three-phase AC voltage.

In other words, a generally-called capacitor-less inverter can be used as the power converting apparatus illustrated in FIG. 1. Here, the capacitor C1 does not require a large capacitance. Thus, for example, a film capacitor that is less expensive and smaller than electrolytic capacitors can be used as the capacitor C1.

When the capacitance of the capacitor C1 is smaller as described above, the resonance frequency of the LC filter 8 tends to increase. Similarly, as the inductance of the reactor L1 is smaller, the more the resonance frequency tends to increase. In FIG. 1, for example, the resonance frequency is approximately 1.125 kHz when the capacitance of the capacitor C1 is 40 μF and the inductance of the reactor L1 is 0.5 mH.

2. Control

Hereinafter, the control on the power converting unit 2 based on a voltage control ratio will be described. The voltage control ratio is a value indicating at which ratio an AC voltage is to be output relative to a voltage to be input to the power converting unit 2. For example, when Vm denotes an amplitude of the output voltage and VC0 denotes an average of the voltage VC, the voltage control ratio is expressed by a ratio of Vm/VC0.

Since the power converting unit 2 performs a switching operation, the voltage VC varies according to the switching. In other words, the voltage VC yields the harmonic component. Since the switching frequency is higher than the ripple frequency of the voltage VC subject to the rectification, the frequency of the harmonic component herein is higher than the ripple frequency.

As described above, the power converting apparatus includes the LC filter 8 formed by the capacitor C1 and the reactor L1. Thus, the resonance to which the LC filter 8 contributes increases the range of variations in the harmonic component of the voltage VC.

Controlling the voltage control ratio in consideration of the variations in the harmonic component of the voltage VC, particularly, controlling the voltage control ratio on the basis of a voltage VL across the reactor L1 itself is known by, for example, Japanese Patent No. 4067021.

The first embodiment will newly propose to consider not only the contribution of the LC filter 8 to the resonance but also the contribution of the power source impedance Z of the AC power supply E1. Furthermore, the second embodiment will propose a technique for controlling an attenuation coefficient of the voltage VC without being dependent on the power source impedance Z.

Considering that a current flows from the power supply line LL to the rectifying unit 1 and then flows to the power supply line LH, a potential of the reactor L1 closer to the capacitor C1 is used for reference as to the voltage VL.

3. Control Structure

The specific control structure will be described. A power converting apparatus according to the following embodiments is operated under control of the power conversion control device 3. FIG. 1 illustrates the configuration of the power conversion control device 3 together with the power converting apparatus as a block diagram.

This power converting apparatus includes a reactor voltage detecting unit 4 and a current detecting unit 5.

The reactor voltage detecting unit 4 detects the voltage VL across the reactor L1, and outputs, for example, information obtained through analog-to-digital conversion on the voltage VL to the power conversion control device 3.

The current detecting unit 5 detects an AC current (AC current that flows through the load M1) output by the power converting unit 2, and outputs, for example, information obtained through analog-to-digital conversion on the AC current to the power conversion control device 3.

In the example of FIG. 1, the power converting unit 2 outputs AC currents in three phases (u, v, and w phases). Among them, the AC currents iu and iv in the two phases (u and v phases) are detected. Since a sum of the three-phase AC currents is ideally zero, the power conversion control device 3 can calculate the AC current iw in the remaining one phase from the two-phase AC currents iu and iv. These currents are appropriately used in a known method to generate the switching signal S.

The power conversion control device 3 includes a gain output unit 31, a voltage control ratio command generating unit 32, and a switching signal generating unit 33.

The power conversion control device 3 is configured to include, for example, a microcomputer and a memory device. The microcomputer executes each process step described in a program (i.e., a procedure), The memory device can be configured from one or more various memories such as a read only memory (ROM), a random access memory (RAM), an erasable nonvolatile memory (erasable programmable ROM or EPROM), and a hard disk device. The memory device stores, for example, various information and data, and a program to be executed by the microcomputer, and provides a work area for execution of the program. Furthermore, it can be grasped that the microcomputer functions as various means corresponding to the process steps described in the program, or that the microcomputer implements various functions corresponding to the process steps.

Furthermore, the power conversion control device 3 is not limited to such but various procedures executed by the power conversion control device 3, or some or all of the means or functions implemented by the power conversion control device 3 may be achieved by hardware.

The gain output unit 31 receives information on the voltage VL and an attenuation coefficient command $\zeta z$ that is a command of a reactor attenuation coefficient, or further information of the inductance L of the reactor L1 and the capacitance C of the capacitor C1, and sets a control gain k. Information on the voltage VC or on a current that flows through the reactor, instead of the voltage VL, may be provided to the gain output unit 31, which will be described later.

The attenuation coefficient command $\zeta z$ represents a command value of an attenuation coefficient in a transfer function of the voltage VC to a power supply voltage VS that is a line-to-line voltage of the AC voltage to be input from the AC power supply E1. The gain output unit 31 sets the control gain k to achieve the received attenuation coefficient command $\zeta z$, through processes to be described later in each of the embodiments.

The voltage control ratio command generating unit 32 receives the control gain k and the voltage VL, and outputs on the basis of these a voltage control ratio command K* required for the voltage control ratio of the power converting unit 2 to be the command value K. Specifically, the command value K is corrected by subtracting a product of the control gain k and the voltage VL to obtain the voltage control ratio command K*. Information on the voltage VC or on a current that flows through the reactor L1, instead of the voltage VL, may be provided to the voltage control ratio command generating unit 32 in the second embodiment.

4. First Embodiment

Figure 2:
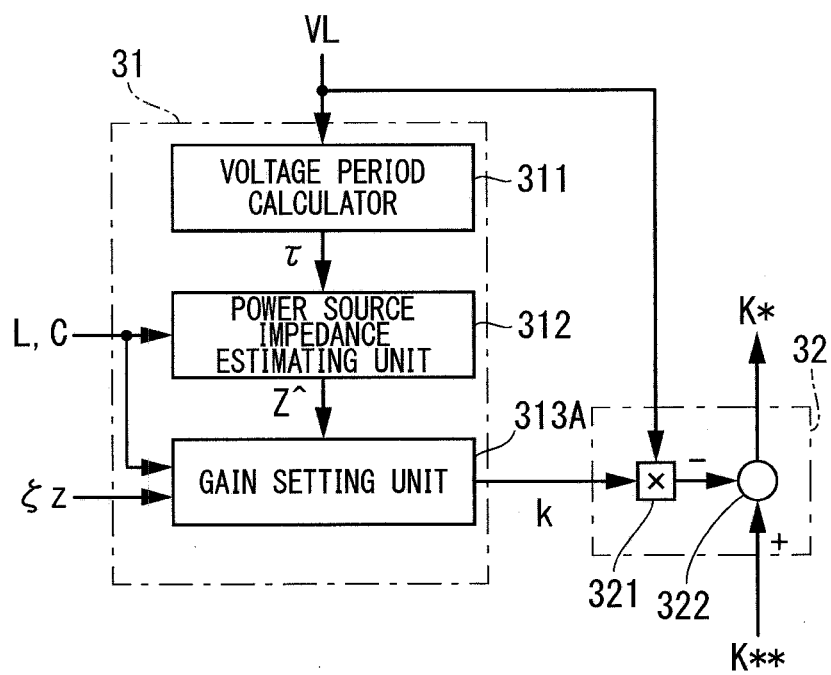
FIG. 2 is a functional block diagram exemplifying a configuration of a gain output unit and a voltage control ratio command generating unit according to the first embodiment.

FIG. 2 is a functional block diagram illustrating an example of a specific internal configuration of the gain output unit 31 and the voltage control ratio command generating unit 32 according to the first embodiment.

The gain output unit 31 includes a voltage period calculator 311, a power source impedance estimating unit 312, and a gain setting unit 313A.

The voltage period calculator 311 obtains an oscillation period $\tau$ of the voltage VL. The power source impedance estimating unit 312 obtains an estimated value $\hat{Z}$ of the power source impedance Z (impedance closer to the AC power supply E1 viewed from the rectifying unit 1). The estimated value $\hat{Z}$ can be obtained from, for example, the oscillation period $\tau$ of the voltage VL, the inductance L, and the capacitance C. A specific method for obtaining this estimated value $\hat{Z}$ will be described later.

The gain setting unit 313A sets the control gain k using the estimated value $\hat{Z}$, the inductance L, the capacitance C, and the attenuation coefficient command $\zeta z$, and outputs the control gain k.

The voltage control ratio command generating unit 32 includes a multiplier 321 and a subtractor 322. The multiplier 321 obtains a product k·VL of the control gain k and the voltage VL. The subtractor 322 subtracts the product k·VL from the command value K** to obtain the voltage control ratio command K*, and outputs the voltage control ratio command K* to the switching signal generating unit 33.

The switching signal generating unit 33 generates a voltage command on the AC voltage to be output from the power converting unit 2, on the basis of the voltage control ratio command K*. The switching signal generating unit 33 further generates the switching signal S, for example, by comparing the voltage command with a carrier. The switching signal generating unit 33 outputs the switching signal S to the power converting unit 2. Since the operations of the switching signal generating unit 33 are performed by a known method (for example, Japanese Patent No. 4067021), the details will be omitted herein.

As described above, the output voltage can be obtained on the basis of the voltage control ratio command K*. Accordingly, the harmonic component of the voltage VC can be reduced. Moreover, since the output voltage is set on the basis of the voltage control ratio command K* obtained by correcting the command value K** in consideration of the power source impedance Z, the varying attenuation coefficient of a voltage to be input to the power converting unit 2 (the voltage VC) is maintained at a desired attenuation coefficient command ζz irrespective of the magnitude of the power source impedance Z.

Next, a specific method for obtaining the estimated value Z^ will be exemplified.

Figure 3:
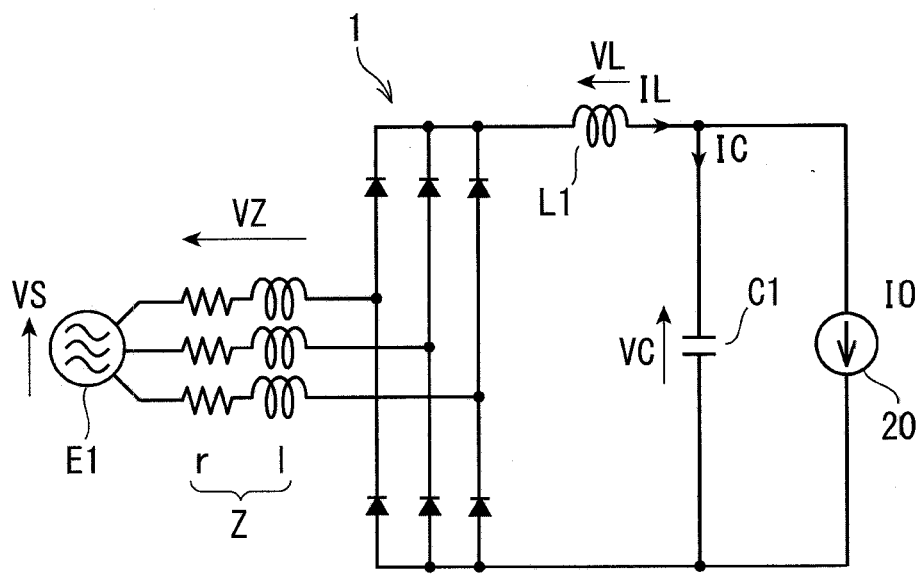
FIG. 3 is a circuit diagram illustrating a simplified equivalent circuit of the power conversion apparatus of FIG. 1.

FIG. 3 illustrates a simplified equivalent circuit of the power conversion apparatus of FIG. 1. Here, the load M1 is an inductive load, and the power converting unit 2 and the load M1 are collectively regarded as a current source 20. The power source impedance Z is represented by a resistance component r and an inductance component l that are in series in each of the phases between the AC power supply E1 and the rectifying unit 1. FIG. 3 also illustrates a current IL that flows through the reactor L1, a current IC that flows through the capacitor C1, a current I0 supplied from the current source 20, and a voltage VZ generated by the power source impedance Z.

In this equivalent circuit, the reactor L1 is connected in series with the capacitor C1 as well as the inductance components l in the two phases. Thus, the resonance frequency in the equivalent circuit is obtained by Equation (1) in consideration of the power source impedance Z.

$$fc = \frac{1}{2\pi\sqrt{(2l+L)C}} \quad (1)$$

Figure 4:
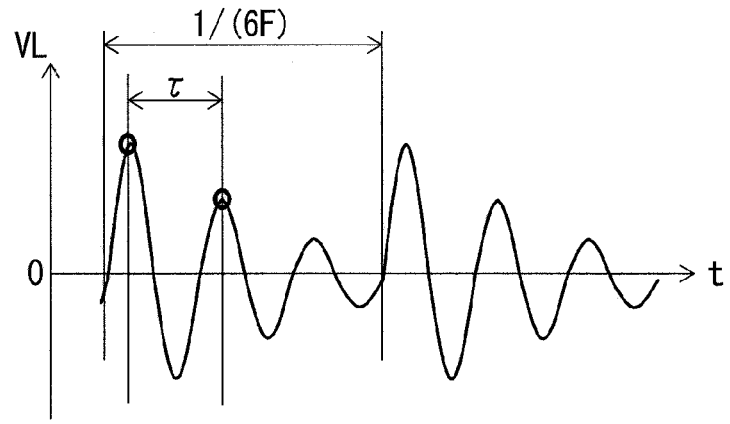
FIG. 4 is a graph schematically illustrating a waveform of a voltage across a reactor.

FIG. 4 is a graph schematically illustrating a waveform of the voltage VL. The horizontal axis represents the time t. The case herein exemplifies that the rectifying unit 1 converts a three-phase voltage using the full-wave rectification. Thus, a larger period of the varying voltage VL is represented by 1/(6F) that is an inverse of a ripple frequency, where F represents a frequency of the power supply voltage VS. The inverse of the resonance frequency fc obtained by Equation (1), that is, 1/fc is regarded as a smaller period τ of the varying voltage VL. This period τ will be hereinafter distinguished as an oscillation period from the period represented by the inverse of the ripple frequency (1/(6F)).

The voltage period calculator 311 obtains the oscillation period τ of the voltage VL. Specifically, the oscillation period τ is obtained using a time between adjacent extreme values of the voltage VL. For example, a time between adjacent local maximum values can be used as the oscillation period τ as it is, as exemplified in FIG. 4. Alternatively, a period double a time between a local minimum value and a local maximum value that are adjacent to each other may be used as the oscillation period τ.

Particularly, since the capacitor-less inverters have a smaller capacitance C, the voltage VC is hardly smoothed, and the resonance caused by the power source impedance Z and the LC filter becomes significant. Thus, it is preferred to use the capacitor-less inverters in the first embodiment to increase the accuracy in obtaining the oscillation period τ.

The inductance component l is obtained from Equation (2) using Equation (1) and the relationship of τ=1/fc.

$$l = \frac{\tau^2}{8\pi^2 C} - \frac{L}{2} \quad (2)$$

As such, the power source impedance Z (particularly, the inductance component l) is estimated from the capacitance C of the capacitor C1, the inductance L of the reactor L1, and the oscillation period τ. The power source impedance estimating unit 312 estimates the power source impedance Z, that is, obtains the estimated value Z^. In order to obtain the estimated value Z^ in such a manner, not only the attenuation coefficient command ζz but also the inductance L of the reactor L1 and the capacitance C of the capacitor C1 are input to the gain output unit 31 according to the first embodiment.

Next, operations according to the first embodiment will be described in more detail. First, a conventional case without regard for the power source impedance Z will be considered to facilitate the understanding of the description.

Figure 5:
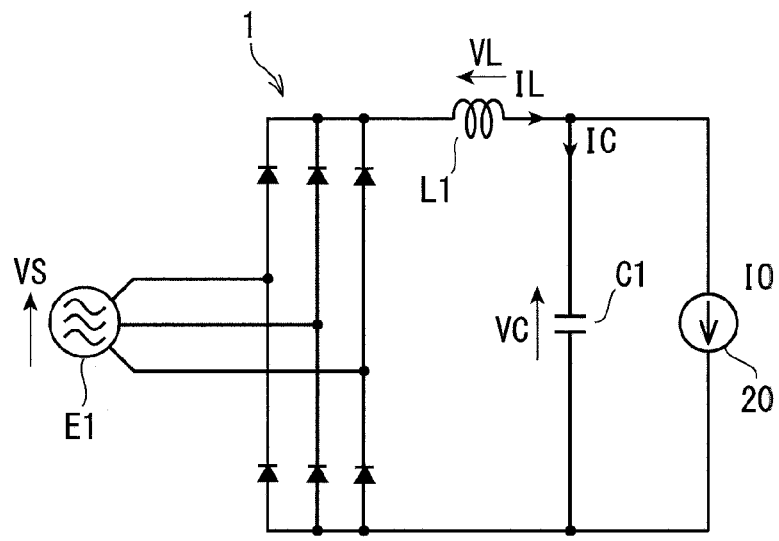
FIG. 5 is a circuit diagram illustrating an equivalent circuit obtained by disregarding a power source impedance in the equivalent circuit of FIG. 3.

FIG. 5 illustrates an equivalent circuit obtained by disregarding the power source impedance Z in the equivalent circuit of FIG. 3. This circuit may be regarded as the equivalent circuit described in Japanese Patent No. 4067021. Thus, the equivalent circuit in FIG. 5 is rewritten to the block diagram in FIG. 6 by setting the current I0 to a value (−k·VL) with introduction of the control gain k as described in Japanese Patent No. 4067021. Here, a Laplace variable s is introduced.

Figure 6:
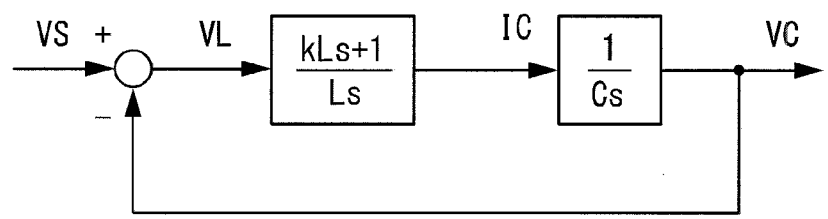
FIG. 6 is a block diagram obtained by rewriting the equivalent circuit of FIG. 5.

With reference to FIG. 6, a transfer function G(s)=VC/VS is expressed by Equations (3) to (5). Since the attenuation coefficient ζ when the power source impedance Z is disregarded is introduced and this coefficient should be set larger, [(2ζ√(LC)s+1]/[(ζ+√(ζ²−1))√(LC)s+1] is approximated to 1 when treated.

$$G(s) = \frac{VC}{VS} = \frac{\frac{kLs+1}{Ls}\frac{1}{Cs}}{1+\frac{kLs+1}{Ls}\frac{1}{Cs}} = \frac{kLs+1}{LCs^2+kLs+1} \quad (3)$$

$$= (kLs+1)\frac{1/LC}{s^2+ks/C+1/LC}$$

$$= \frac{2\zeta\sqrt{LC}\,s+1}{\left(\zeta+\sqrt{\zeta^2-1}\right)\sqrt{LC}\,s+1} \times \frac{1}{\left(\zeta-\sqrt{\zeta^2-1}\right)\sqrt{LC}\,s+1}$$

$$= \frac{1}{Ts+1}$$

$$T = \left(\zeta - \sqrt{\zeta^2-1}\right)\sqrt{LC} \quad (4)$$

$$\zeta = \frac{k}{2}\sqrt{\frac{L}{C}} \quad (5)$$

Figure 7:
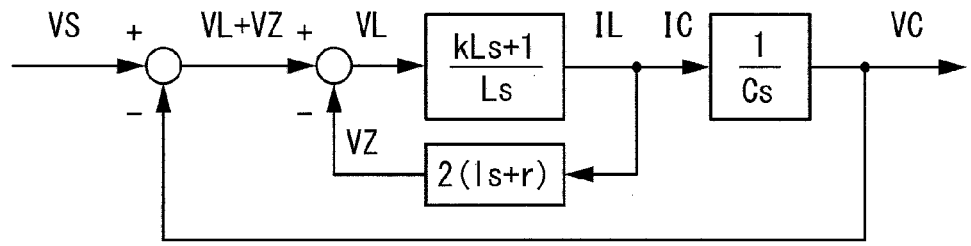
FIG. 7 is a block diagram obtained by rewriting the equivalent circuit of FIG. 3.
Figure 8:
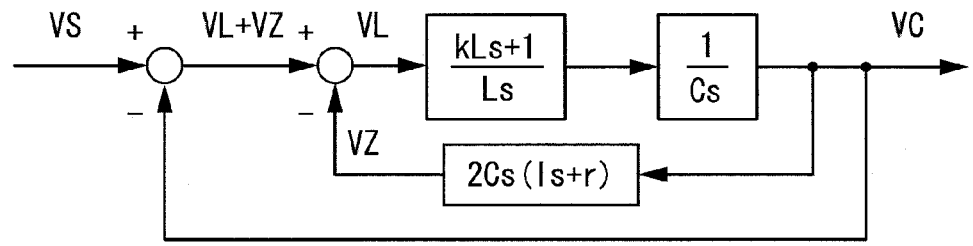
FIG. 8 is a block diagram obtained by modifying the block diagram of FIG. 7.

The equivalent circuit of FIG. 3 according to the first embodiment is rewritten to the block diagram of FIG. 7 by adding to the block diagram of FIG. 6 a block with consideration given to the voltage VZ. This diagram is modified into the structure in FIG. 8. The structure in FIG. 8 is further modified into the structure in FIG. 9.

Figure 9:
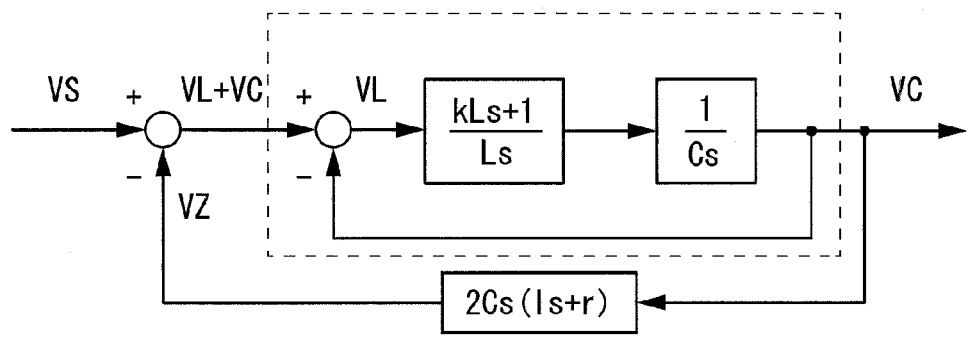
FIG. 9 is a block diagram obtained by modifying the block diagram of FIG. 8.
Figure 10:
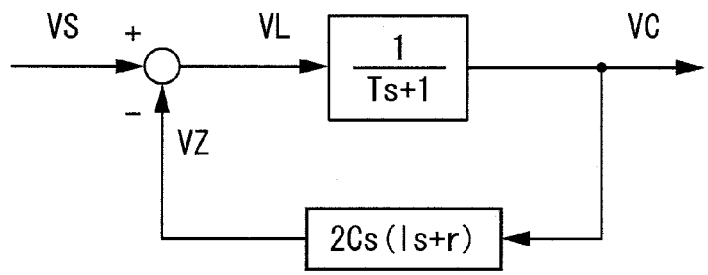
FIG. 10 is a block diagram obtained by modifying the block diagram of FIG. 9.

The portion encircled by the dotted line in FIG. 9 is the same as the structure in FIG. 6 according to a conventional technique. Thus, the transfer function in this portion is expressed by Equations (3) to (5) (using an approximation in which a conventional attenuation coefficient ζ is larger). Accordingly, the structure in FIG. 9 is further modified into the structure in FIG. 10.

Thus, the transfer function according to the first embodiment is expressed by Equation (6).

$$G(s) = \frac{VC}{VS} = \frac{\frac{1}{Ts+1}}{1 + \frac{1}{Ts+1}2Cs(ls+r)} \cdot \frac{1/(2Cl)}{s^2 + (2Cr+T)s/(2Cl) + 1/(2Cl)} \quad (6)$$

The attenuation coefficient command ζz obtained by Equation (6) is expressed by Equation (7) with reference to Equation (4).

$$\zeta z = \frac{Cr+T}{2\sqrt{2lC}} = \frac{Cr + (\zeta - \sqrt{\zeta^2-1})\sqrt{LC}}{2\sqrt{2lC}} \quad (7)$$

Since the conventional attenuation coefficient ζ is larger, the first term (Cr) is more trivial than the second term in the numerator of Equation (7). The attenuation coefficient command ζz is further expressed by Equation (8) with reference to Equation (5).

$$\zeta z = \frac{\left(\frac{k}{2}\sqrt{\frac{L}{C}} - \sqrt{\left(\frac{k}{2}\sqrt{\frac{L}{C}}\right)^2 - 1}\right)\sqrt{LC}}{2\sqrt{2lC}} \quad (8)$$

As such, the control gain k is determined by the approximation with disregard of the resistance component r of the power source impedance Z, using the inductance component l of the power source impedance Z, the capacitance C of the capacitor C1, the inductance L of the reactor L1, and the attenuation coefficient command ζz.

The inductance component l of the power source impedance Z is estimated as expressed by Equation (2). Thus, the control gain k is set by inputting a desired attenuation coefficient command ζz. The gain setting unit 313A sets the control gain k as described above.

Accordingly, the inductance component l of the estimated value $Z\hat{}$ is obtained from the oscillation period τ, the inductance L, and the capacitance C.

Obviously, the resistance component r of the power source impedance Z can be estimated. For example, the attenuation coefficient command ζz may be determined by adding the term (Cr) to the numerator of Equation (8), using the resistance component r to be estimated in the following manner.

Specifically, there is a relationship expressed by Equation (9) between the power supply voltage VS, the voltages VL and VC, the current IL, the resistance component r of the power source impedance Z, and the inductance component l, with reference to FIG. 3. Thus, with estimation of the inductance component l as described above, the resistance component r of the estimated value $Z\hat{}$ can be obtained.

$$VS = 2VZ - VL - VC \quad (9)$$
$$= 2\left(l\frac{d}{dt}IL + rIL\right) - VL - VC$$
$$\therefore r = \frac{1}{2IL}\left(VS + VL + VC - l\frac{d}{dt}IL\right)$$

In other words, the gain setting unit 313A can set the control gain k using at least the inductance component l of the estimated value $Z\hat{}$ or further the resistance component r.

Figure 11:
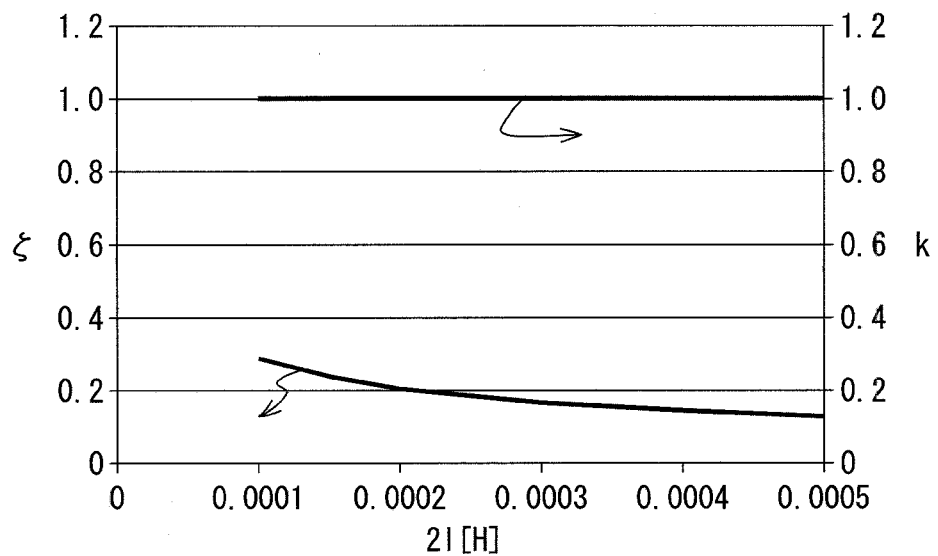
FIG. 11 is a graph representing a relationship between an inductance component of a power source impedance, an attenuation coefficient, and a control gain in a conventional technique.

FIG. 11 is a graph representing a relationship between a value of the inductance component l, the attenuation coefficient ζ, and the control gain k. FIG. 11 illustrates a case where the control gain k is set to 1 that is a constant value, which represents a conventional technique.

Figure 12:
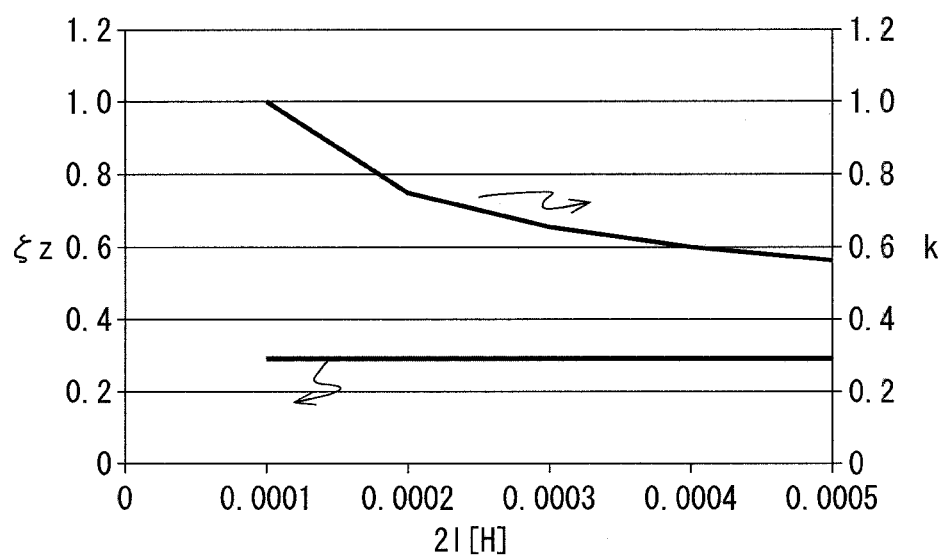
FIG. 12 is a graph representing a relationship between an inductance component of a power source impedance, an attenuation coefficient, and a control gain according to the first embodiment.

FIG. 12 is a graph representing a relationship between a value of the inductance component l, the attenuation coefficient command ζz, and the control gain k. FIG. 12 illustrates a case where the control gain k is set on the basis of Equation (8), which represents a technique of the first embodiment.

In both of the graphs, the horizontal axis represents a value 2l that is double the inductance component l. Furthermore, the attenuation coefficient ζ is equal to the attenuation coefficient command ζz when 2·l=0.0001 [H] (i.e., l=0.05 [mH]). Furthermore, the control gain k herein is common in both FIGS. 11 and 12. Furthermore, the resistance component is set to r=0.

In the graph of FIG. 11, the larger the inductance component l is, the more the attenuation coefficient ζ decreases. In contrast, the attenuation coefficient command ζz is maintained irrespective of the inductance component l in the graph of FIG. 12. Thus, unlike the conventional technique, it is clear that the control gain k is set so as to maintain a desired attenuation coefficient command ζz, irrespective of the inductance component l according to the first embodiment.

Figure 13:
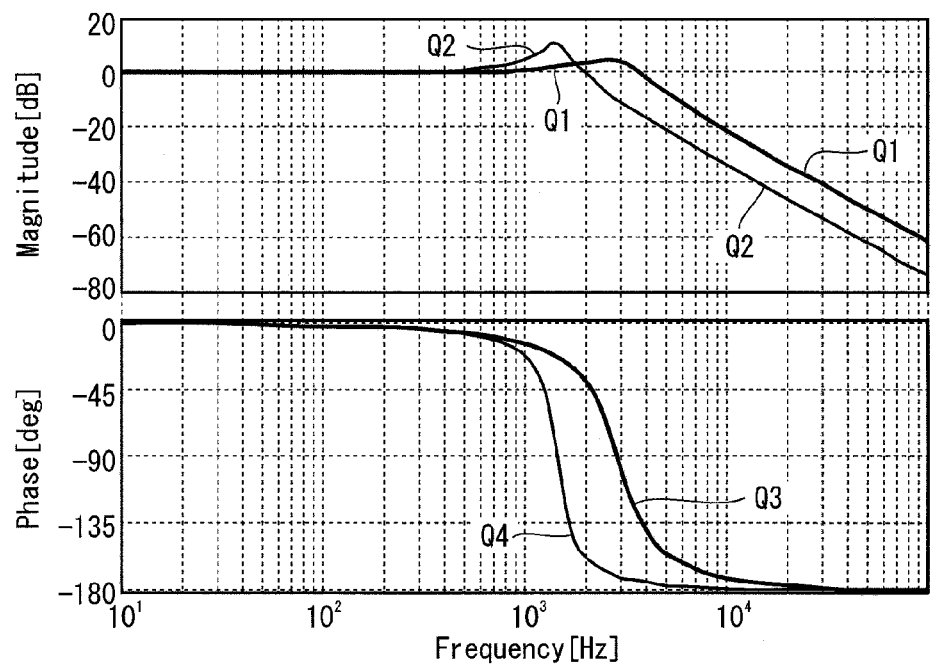
FIG. 13 is a Bode diagram of a transfer function in a conventional technique.
Figure 14:
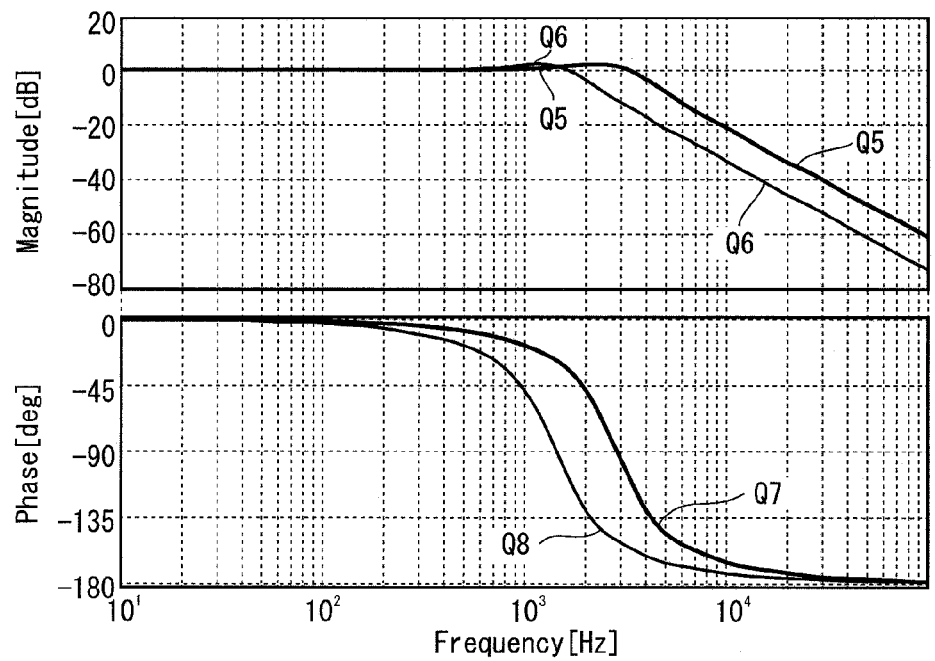
FIG. 14 is a Bode diagram of a transfer function according to the first embodiment.

FIGS. 13 and 14 are both Bode diagrams of the transfer function G(s). FIG. 13 illustrates a case where the control gain k is constant, which represents a conventional technique. FIG. 14 illustrates a case where the control gain k is set on the basis of Equation (8), which represents a technique of the first embodiment.

The curves Q1 and Q3 in FIG. 13 and the curves Q5 and Q7 in FIG. 14 represent a case where l=0.05 [mH]. The curves Q2 and Q4 in FIG. 13 and the curves Q6 and Q8 in FIG. 14 represent a case where l=0.2 [mH]. In both of the cases, the resistance component is set to r=0.

The graphs in FIG. 13 show that resonance more easily occurs as the inductance component l is larger. In contrast, the graphs of FIG. 14 show that resonance hardly occurs even when the inductance component l is larger. Thus, unlike the conventional technique, it is clear that variations in the voltage VC to be input to the power converting unit 2 are suppressed irrespective of the inductance component l according to the first embodiment.

One of the desired processes is providing a preceding period before causing the load M1 to start a desired drive operation and driving the power converting apparatus using a temporary command value K** and a temporary attenuation coefficient command ζz during the preceding period. Accordingly, the gain setting unit 313A can obtain the estimated value $Z\hat{}$ and the advantages above in the desired drive operation afterward.

In the example of FIG. 1, the reactor L1 is provided on the power supply line LH and closer to the rectifying unit 1 than the capacitor C1. Without being limited to this, the same holds true even when the reactor L1 is provided on the power supply line LL.

Accordingly, controlling the power converting unit 2 using the voltage control ratio command K* with consideration given to the power source impedance Z can maintain the attenuation coefficient ζ of variations in voltage to be input to the power converting unit 2 at a desired value (the attenuation coefficient command ζz), irrespective of the magnitude of the power source impedance Z according to the first embodiment.

In the capacitor-less inverters, the voltage VC is hardly smoothed. Thus, the oscillation period τ may be obtained not from the voltage VL but from the voltage VC. More specifically, the oscillation period τ may be obtained using a time between adjacent extreme values of the voltage VC. Alternatively, the oscillation period τ may be similarly obtained from the current IL. This is because in view of the equivalent circuit illustrated in FIG. 3, the voltages VL and VC and the current IL oscillate with the same oscillation period T. The voltage VC and the current IL can be detected using a known technique.

The oscillation period τ is used to estimate the inductance component l as indicated by Equation (2). Furthermore, the oscillation period τ does not appear in Equations (3) to (9). Thus, the control gain k determined by Equation (8) may be determined on the basis of the oscillation period τ obtained from any one of the voltages VL and VC and the current IL. In other words, the voltage period calculator 311 may obtain not the oscillation period r of the voltage VL but the oscillation period r of the voltage VC or the current IL when determining the oscillation period τ. In other words, information on the voltage VC or the current IL may be input to the gain output unit 31, instead of information on the voltage VL.

Furthermore, a product of the control gain k and the voltage VL is assumed to be used in Equation (3) based on the block diagram of FIG. 6. Thus, the command value K** is corrected by the product of the control gain k and the voltage VL to obtain the voltage control ratio command K*, irrespective of from which one of the voltages VL and VC and the current IL, the oscillation period r is obtained to determine the control gain k.

5. Second Embodiment

The second embodiment uses a technique for evaluating an attenuation coefficient itself and changing the attenuation coefficient to an attenuation coefficient command that is a command value of the attenuation coefficient. Thus, it is unnecessary to estimate the power source impedance Z as described in the first embodiment.

Figure 15:
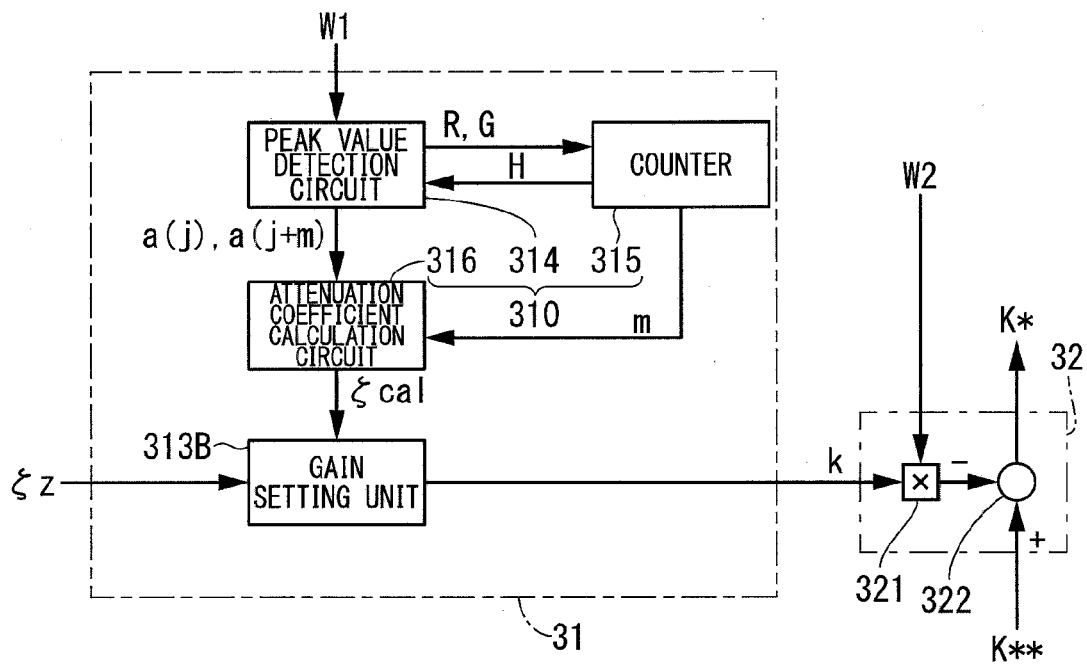
FIG. 15 is a functional block diagram exemplifying a configuration of a gain output unit and a voltage control ratio command generating unit according to the second embodiment.

FIG. 15 is a functional block diagram illustrating an example of a specific internal configuration of the gain output unit 31 and the voltage control ratio command generating unit 32 according to the second embodiment.

In the second embodiment, the gain output unit 31 includes a peak value detection circuit 314, a counter 315, an attenuation coefficient calculation circuit 316, and a gain setting unit 313B. The peak value detection circuit 314, the counter 315, and the attenuation coefficient calculation circuit 316 are collectively regarded as an attenuation coefficient solution circuit 310 functioning to obtain an attenuation coefficient ζcal to be described later.

The specific internal configuration of the voltage control ratio command generating unit 32 to be used in the second embodiment is the same as that of the first embodiment.

One of the voltages VC and VL and the current IL is input to the gain output unit 31 as a measuring object W1. The gain output unit 31 sets the control gain k on the basis of the measuring object W1 and the attenuation coefficient command ζz, and outputs the control gain k.

One of the voltages VC and VL and the current IL is input to the voltage control ratio command generating unit 32 as a multiplicand W2 to the control gain k. The voltage control ratio command generating unit 32 corrects the command value K by subtracting a product k·W2 of the multiplicand W2 and the control gain k from the command value K to obtain the voltage control ratio command K*.

Each of the measuring object W1 and the multiplicand W2 is selected from among the voltages VC and VL and the current IL. The measuring object W1 and the multiplicand W2 may be the same or different from each other. The measuring object W1 is different from the multiplicand W2 in that the measuring object W1 is preferred to be filtered, which will be described later.

The peak value detection circuit 314 detects a local maximum value a(i) (for example, i is a positive integer) of the measuring object W1, and holds the value. The peak value detection circuit 314 provides the counter 315 with a notification G indicating, for example, detection of a local maximum value.

Figure 16:
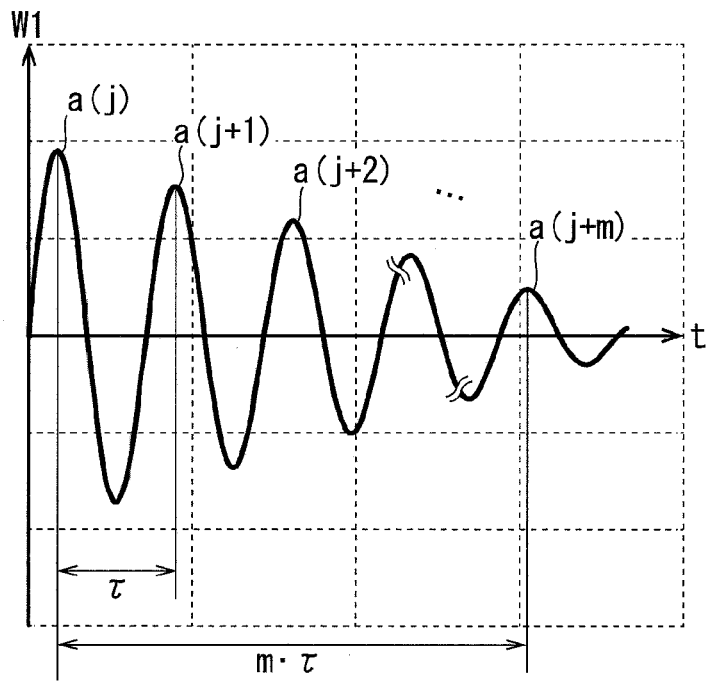
FIG. 16 is a graph exemplifying a waveform of a measuring object.

FIG. 16 is a graph exemplifying a waveform of the measuring object W1. The measuring object W1 is attenuated while oscillating as the time t proceeds. Thus, the local maximum value necessary to accurately obtain the attenuation coefficient ζcal has to be a local maximum value obtained during which the measuring object W1 is being attenuated. Thus, when a pair of local maximum values consecutively obtained by the peak value detection circuit 314 indicates a temporal increase, the peak value detection circuit 314 applies a reset signal R for resetting the counter 315 to an initial value (for example, i=1) to the counter 315.

The counter 315 issues an output command H to the peak value detection circuit 314 upon receipt of the notification G when reset. In response to the output command H, the peak value detection circuit 314 outputs the local maximum value a(j) to the attenuation coefficient calculation circuit 316 or stores the value therein.

The counter 315 also issues the output command H to the peak value detection circuit 314 upon receipt of a (m+1)-th notification G inclusive of the notification G when reset. In response to the output command H, the peak value detection circuit 314 outputs the local maximum value a(j+m) to the attenuation coefficient calculation circuit 316 or stores the value therein.

A pair of the local maximum values a(j) and a(j+m) each may be output to the attenuation coefficient calculation circuit 316 every time the output command H is issued to the peak value detection circuit 314 as described above, or the pair may be output to the attenuation coefficient calculation circuit 316 at the same timing when the notification G is provided. For example, upon receipt of the notification G indicating application of the reset signal R to the counter 315, the pair of the local maximum values a(j) and a(j+m) stored in the peak value detection circuit 314 before the reset signal R is generated may be output to the attenuation coefficient calculation circuit 316.

FIG. 16 also illustrates the oscillation period τ and a period m·τ indicating m oscillation periods τ. The measuring object W1 has (m−1) local maximum values between the pair of the local maximum values a(j) and a(j+m). In view of this, the attenuation coefficient calculation circuit 316 obtains a logarithmic decrement δ of the measuring object W1 according to Equation (10) using the integer m that is larger than the number (m−1) by 1, and a ratio a(j)/a(j+m) of the pair of the local maximum values a(j) and a(j+m). The symbol "ln( )" denotes a natural logarithm in parentheses (logarithm using a Napiers constant as the base).

$$\delta = \frac{1}{m} \times \ln\left(\frac{a(j)}{a(j+m)}\right) \quad (10)$$

The attenuation coefficient ζcal is obtained by Equation (11) using the logarithmic decrement δ and Pi (π). The approximately equals sign (nearly equal) is valid when the attenuation coefficient ζcal is sufficiently smaller than 1.

$$\zeta\text{cal} = \sqrt{\frac{1}{1+\left(\frac{2\pi}{\delta}\right)^2}} \approx \frac{\delta}{2\pi} \quad (11)$$

The attenuation coefficient ζcal obtained in such a manner may be regarded as a measurement value of the attenuation coefficient for the measuring object W1.

The attenuation coefficient calculation circuit 316 may obviously obtain the attenuation coefficient kcal using an equation obtained by substituting Equation (10) into Equation (11) without preliminarily obtaining the logarithmic decrement δ.

Figure 17:
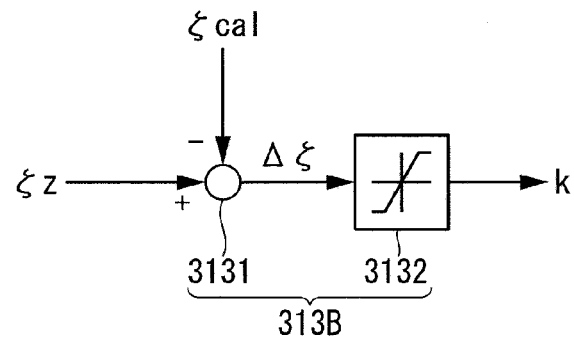
FIG. 17 is a block diagram exemplifying a configuration of a gain setting unit.

FIG. 17 is a block diagram exemplifying a configuration of the gain setting unit 313B. The gain setting unit 313B includes a subtractor 3131 and a gain determining unit 3132. The subtractor 3131 subtracts the attenuation coefficient ζcal from the attenuation coefficient command ζz to obtain a deviation Δζ. The gain determining unit 3132 determines the control gain k to be higher as the deviation Δζ is larger. The effect of correcting the command value K** becomes excessive if there is no limit to a range of variations in the control gain k, which is not desirable. Thus, it is preferred that the gain determining unit 3132 also functions as a limiter having upper and lower limits.

In view of Equation (1), an attenuation coefficient of the multiplicand W2 that is subject to resonance is identical to the attenuation coefficient ζcal of the measuring object W1 that is subject to resonance. Thus, correcting the command value K** by subtracting a product k·W2 of the control gain k set on the basis of the attenuation coefficient ζcal and the multiplicand W2 to obtain the voltage control ratio command K* produces the advantage similar to that of the first embodiment, that is, maintaining a desired attenuation coefficient command ζz. Furthermore, the power source impedance Z does not have to be estimated in the second embodiment.

Since variations in ripple frequency are also superimposed on the measuring object W1, it is preferred to eliminate the influence of the variations (ripples) to accurately obtain the attenuation coefficient ζcal from the local maximum values of the measuring object W1.

Figure 18:
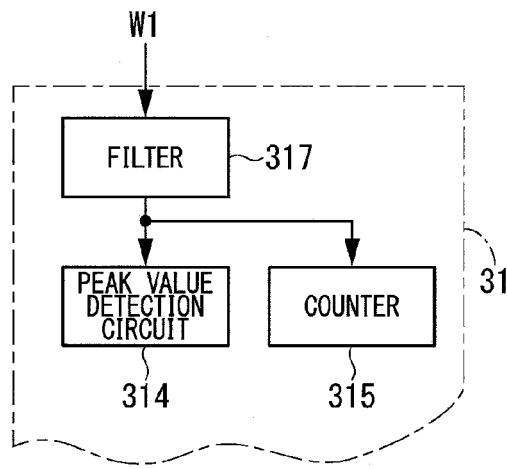
FIG. 18 is a block diagram partially exemplifying a configuration of the gain output unit as a modification of the second embodiment.

FIG. 18 is a block diagram partially exemplifying the configuration of the gain output unit 31 as a modification of the second embodiment. The gain output unit 31 according to this modification uses a configuration obtained by adding a filter 317 to the configuration of FIG. 15. The peak value detection circuit 314 receives not the measuring object W1 itself but the measuring object W1 in which low-frequency components are reduced. However, FIG. 18 omits the illustration of the attenuation coefficient calculation circuit 316 and the gain setting unit 313B illustrated in FIG. 15 (the same holds true for FIGS. 19, 21, and 23 to be described later).

A high-pass filter is used as the filter 317 which has a function of reducing a component lower than the resonance frequency fc (=1/τ), specifically, frequency components lower than or equal to the ripple frequency. When one of the current IL and the voltage VC is used as the measuring object W1, either one of the two contains a DC component. However, the DC component is also reduced by the high-pass filter. Thus, when any one of the current IL and the voltages VL and VC is used as the measuring object W1, the influence of either the ripple frequency component or the DC component on the ratio a(j)/a(j+m) of the local maximum values is small. Accordingly, the attenuation coefficient ζcal is accurately obtained.

However, when the ripple frequency and the resonance frequency fc are closer, it is not easy to produce a high-pass filter that reduces the ripple frequency component while leaving the component of the resonance frequency fc. Thus, the third embodiment uses a technique for removing the ripple frequency component from the measuring object W1 by calculation.

6. Third Embodiment

Figure 19:
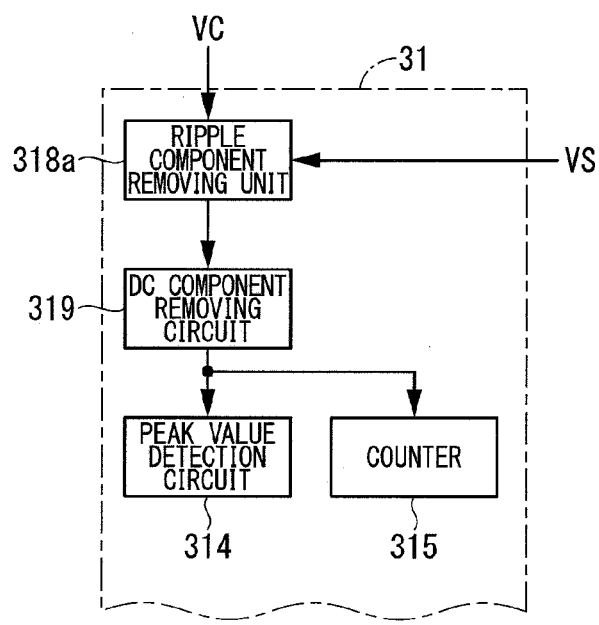
FIG. 19 is a block diagram partially exemplifying the configuration of the gain output unit as a first configuration of a third embodiment.

FIG. 19 is a block diagram illustrating a first configuration of the third embodiment. Specifically, FIG. 19 partially exemplifies the configuration of the gain output unit 31. In this first configuration, the voltage VC is used as the measuring object W1. A configuration in which the filter 317 in FIG. 18 is replaced with a ripple component removing unit 318a and a DC component removing circuit 319 is used as the first configuration.

The ripple component removing unit 318a is given information on the power supply voltage VS (VS also denotes the information for simplification in the drawings). Accordingly, it is possible to calculate a phase ωt (t denotes a time and ω denotes an angular frequency) and an effective value Vn of the amplitude of an N-phase AC voltage to be input from the AC power supply E1.

A value VCh of the voltage VC obtained when an oscillation caused by resonance does not occur and the loss is disregarded will be discussed below. Since the ripple component of the voltage rectified by the rectifying unit 1 exists, the function D (ωt) of the phase wt is introduced.

$$VCh = \sqrt{2}Vn \cdot D(\omega t) \quad (12)$$

Figure 20:
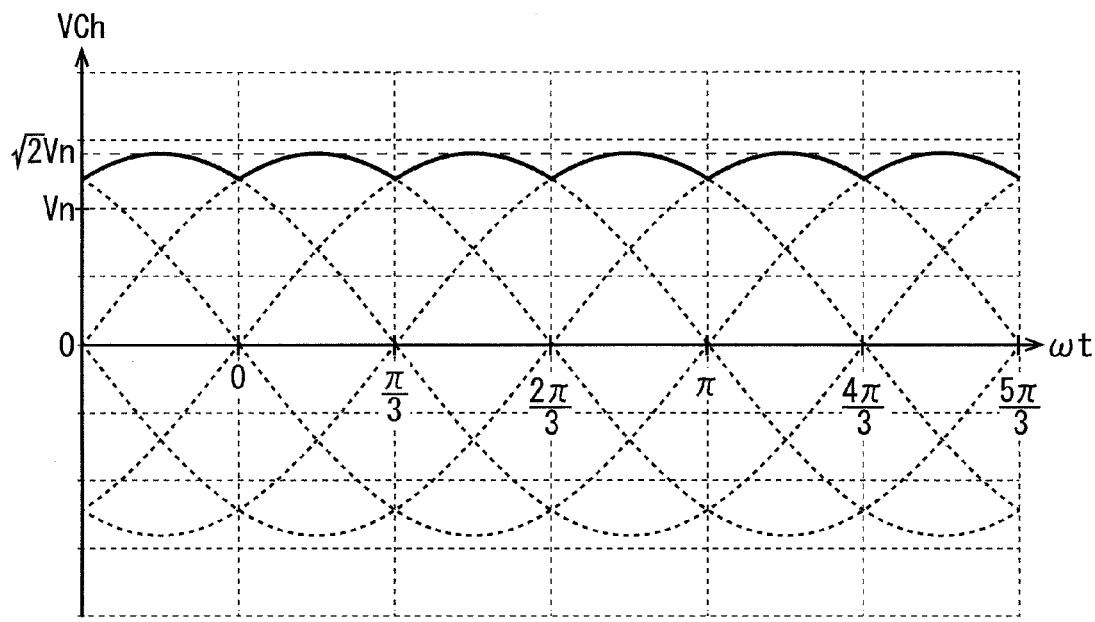
FIG. 20 is a graph representing waveforms of a voltage across a capacitor when an oscillation caused by resonance does not occur.

FIG. 20 is a graph representing waveforms of the value VCh when a multi-phase AC voltage to be input from the AC power supply E1 is a three-phase AC voltage and the rectifying unit 1 performs the full-wave rectification. The solid line represents a waveform of the value VCh, and the dotted lines represent waveforms of the three-phase AC voltage.

The value VCh in FIG. 20 represents a periodic function having a period of π/3. Here, the function D(ωt) of the phase ωt is expressed by the following Equation (13).

$$D(\omega t) = \sin(\omega t - p \cdot \pi/3) \text{ (where } (p+1) \cdot \pi/3 \leq \omega t \leq (p+2) \cdot \pi/3) \quad (13)$$

Dividing the voltage VC by the value VCh removes the ripple component caused by the rectification from the measuring object W1.

As seen from FIG. 20, the value VCh has a DC component, and thus the voltage VC also has a DC component. The DC component removing circuit 319 removes the DC components.

Even when the ripple frequency and the resonance frequency fc are closer, the similar functions of the filter 317 can be achieved by the functions of the ripple component removing unit 318a and the DC component removing circuit 319.

Figure 21:
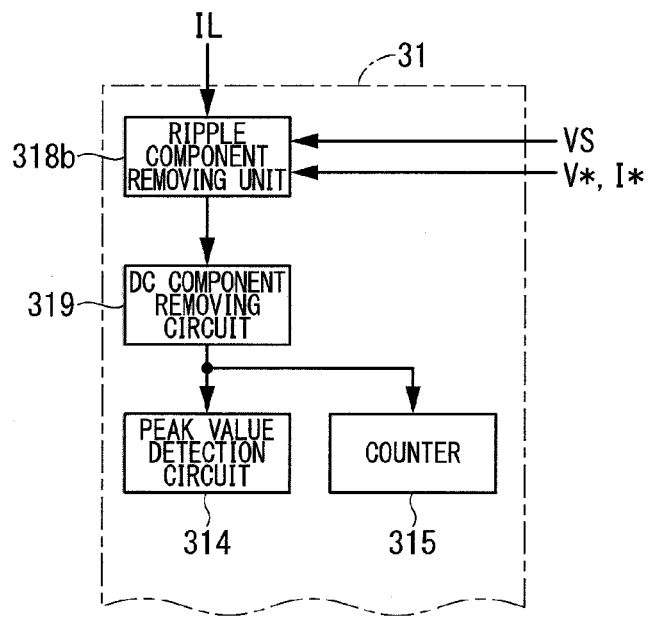
FIG. 21 is a block diagram partially exemplifying the configuration of the gain output unit as a second configuration of the third embodiment.

FIG. 21 is a block diagram illustrating a second configuration of the third embodiment. Specifically, FIG. 21 partially exemplifies the configuration of the gain output unit 31. In this second configuration, the current IL is used as the measuring object W1. A configuration in which the ripple component removing unit 318a in FIG. 19 is replaced with a ripple component removing unit 318b is used as the second configuration.

Figure 22:
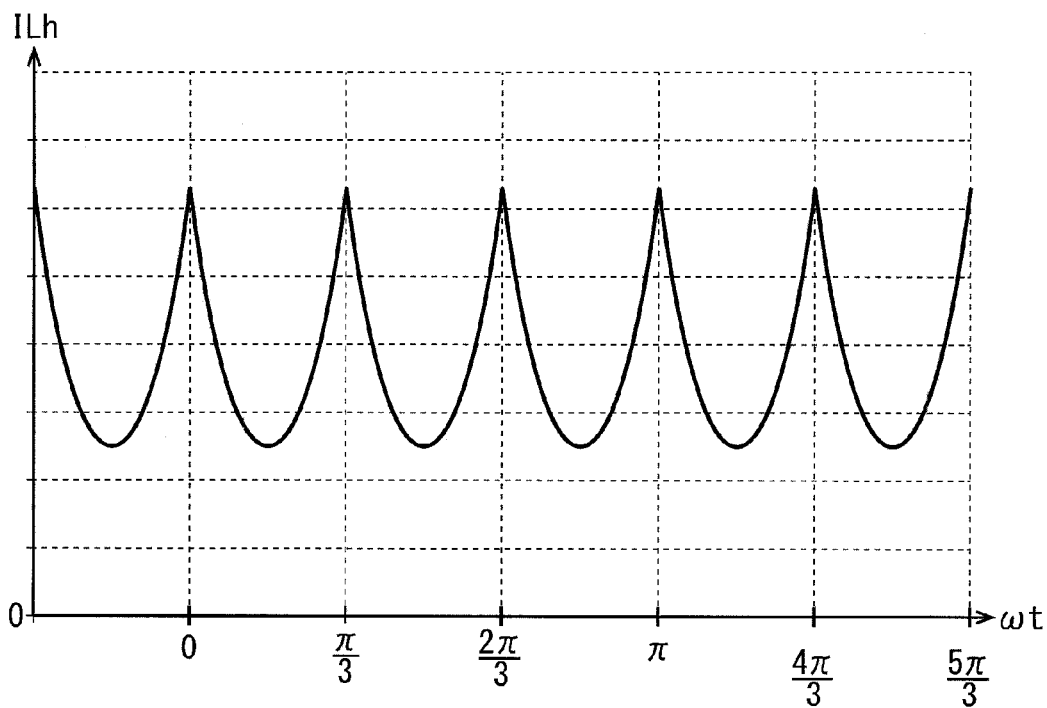
FIG. 22 is a graph representing a waveform of a current that flows through the reactor when an oscillation caused by resonance does not occur.

FIG. 22 is a graph representing a waveform of a value ILh of the current IL when an oscillation caused by resonance does not occur and the loss is disregarded. The assumption herein is that the multi-phase AC voltage to be input from the AC power supply E1 is a three-phase AC voltage and the rectifying unit 1 performs the full-wave rectification. The value ILh in FIG. 22 represents a periodic function having a period of $\pi/3$.

The ripple component removing unit 318b is given the information on the power supply voltage VS, and command values V* and I* of an output voltage and an output current of the power converting unit 2, respectively. The command values V* and I* are used in the power conversion control device 3 with a known technique. Thus, the command values V* and I* are given to the ripple component removing unit 318b in the power conversion control device 3.

A power Pinv to be input to the power converting unit 2 is expressed by the following Equation (14) as a product of the values ILh and VCh.

$$P\mathrm{inv} = VCh \cdot ILh \tag{14}$$

Ideally, there is no loss at the power converting unit 2, and the power Pinv to be input is equal to an output power from the power converting unit 2. Since the output power can be expressed by a known function J (V*, I*) using the command values V* and I* as variables, the following Equation (15) holds.

$$ILh = \frac{P\mathrm{inv}}{VCh} = \frac{J(V^*, I^*)}{\sqrt{2}\, Vn \cdot D(\omega t)} \tag{15}$$

Dividing the current IL by the value ILh removes the ripple component caused by the rectification from the measuring object W1.

As seen from FIG. 22, the value ILh has a DC component, and thus the current IL also has a DC component. The DC component removing circuit 319 removes the DC components.

Even when the ripple frequency and the resonance frequency fc are closer, the similar functions of the filter 317 can be achieved by the functions of the ripple component removing unit 318b and the DC component removing circuit 319 as described above.

Figure 23:
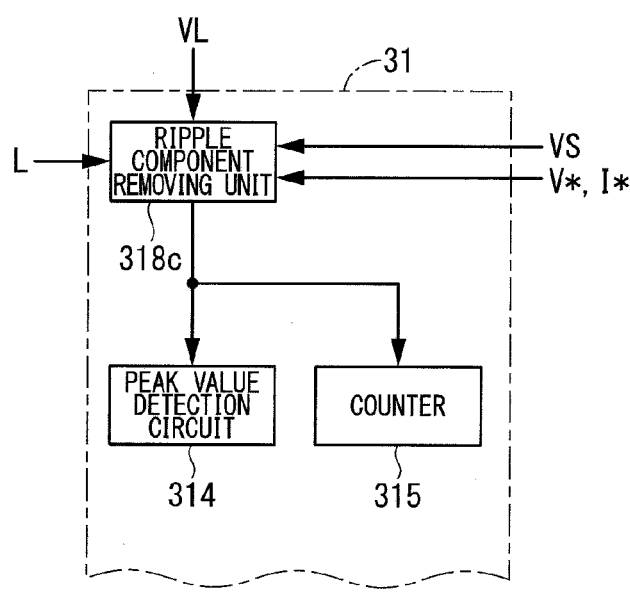
FIG. 23 is a block diagram partially exemplifying the configuration of the gain output unit as a third configuration of the third embodiment.

FIG. 23 is a block diagram illustrating a third configuration of the third embodiment. Specifically, FIG. 23 partially exemplifies the configuration of the gain output unit 31. In this third configuration, the voltage VL is used as the measuring object W1. A configuration in which the ripple component removing unit 318b and the DC component removing circuit 319 in FIG. 21 are replaced with a ripple component removing unit 318c is used as the third configuration. The ripple component removing unit 318c is given the information on the power supply voltage VS, and the command values V* and I*, similarly as the ripple component removing unit 318b.

FIG. 24 is a graph representing a waveform of a value VLh of the voltage VL when an oscillation caused by resonance does not occur and the loss is disregarded. The assumption herein is that a multi-phase AC voltage to be input from the AC power supply E1 is a three-phase AC voltage and the rectifying unit 1 performs the full-wave rectification. The value VLh in FIG. 24 represents a periodic function having a period of $\pi/3$.

The value VLh is obtained by the following Equation (16) using Equations (12) to (15) that are current expressions.

$$VLh = L \cdot \frac{d}{dt} ILh \tag{16}$$

$$= \frac{-\omega \cdot L}{\sqrt{2}\, Vn} \cdot \frac{\cos(\omega t - p \cdot \pi/3)}{\sin^2(\omega t\ p \cdot \pi/3)} \cdot J(V^*, I^*)$$

Dividing the voltage VL by the value VLh removes the ripple component caused by the rectification from the measuring object W1.

The voltage VL does not have a DC component because it is proportional to a derivative value of the value ILh. Thus, the DC component removing circuit 319 is unnecessary.

As described above, when the control gain k is obtained in the second embodiment and the first to third configurations of the third embodiment, the inductance L is used but the capacitance C is never used. Thus, the input of the capacitance C to the gain output unit 31 can be omitted unlike the illustration of FIG. 1.

Furthermore, when the control gain k is obtained in the second embodiment and the first and second configurations of the third embodiment, neither the inductance L nor the capacitance C is used. Thus, the input of the inductance L and the capacitance C to the gain output unit 31 can be omitted unlike the illustration of FIG. 1.

While the invention has been shown and described in detail, the foregoing description is in all aspects illustrative and not restrictive. It is therefore understood that numerous modifications and variations can be devised without departing from the scope of the invention.

The invention claimed is:

1. A power conversion control device that controls a power converting apparatus including:
a pair of power supply lines;
a capacitor provided between said pair of power supply lines;
a reactor that forms, with said capacitor, an LC filter that is a choke-input filter;
a rectifying unit that rectifies a first AC voltage to be input from a power supply into a DC voltage to output said DC voltage to said LC filter; and
a power converting unit that converts, on the basis of a switching signal, a voltage across said capacitor into a second AC voltage,
said power conversion control device comprising:
a gain setting unit that sets a control gain on the basis of an attenuation coefficient command that is a command value of an attenuation coefficient of one of a voltage across said reactor, a current input to said reactor, and said voltage across said capacitor;
a voltage control ratio command generating unit that corrects a command value of a voltage control ratio by subtracting a product of said control gain and said one of said voltage across said reactor, said current input to said reactor, and said voltage across said capacitor to output a voltage control ratio command, said voltage control ratio being a ratio of an amplitude of said second AC voltage to an average of said voltage across said capacitor; and a switching signal generating unit that generates said switching signal on the basis of said voltage control ratio command.

2. The power conversion control device according to claim 1, further comprising a power source impedance estimating unit that obtains an estimated value of an impedance on a side of said power source viewed from said rectifying unit, wherein said gain setting unit sets said control gain using said estimated value, an inductance of said reactor, a capacitance of said capacitor, and said attenuation coefficient command, and said voltage control ratio command generating unit subtracts from said command value a product of said control gain and said voltage across said reactor to output said voltage control ratio command.

3. The power conversion control device according to claim 2, further comprising a voltage period calculator that calculates an oscillation period of said one of said voltage across said reactor, said current input to said reactor, and said voltage across said capacitor, wherein said power source impedance estimating unit obtains at least an inductance component of said estimated value from said oscillation period, said inductance, and said capacitance, and said gain setting unit sets said control gain using said at least inductance component of said estimated value, said capacitance, and said attenuation coefficient command.

4. The power conversion control device according to claim 3, wherein said power source impedance estimating unit further obtains a resistance component of said estimated value from a line-to-line voltage of said power supply, said voltage across said reactor, said voltage across said capacitor, said current that flows through said reactor, and said inductance component of said estimated value, and said gain setting unit sets said control gain using said inductance component and said resistance component of said estimated value, said capacitance, and said attenuation coefficient command.

5. The power conversion control device according to claim 1, further comprising an attenuation coefficient solution circuit that obtains said attenuation coefficient of a measuring object that is said one of said voltage across said reactor, said current input to said reactor, and said voltage across said capacitor, wherein said gain setting unit sets said control gain on the basis of a deviation obtained by subtracting said attenuation coefficient from said attenuation coefficient command, and said voltage control ratio command generating unit corrects said command value by subtracting a product of said control gain and said measuring object to output said voltage control ratio command.

6. The power conversion control device according to claim 5, wherein said first AC voltage has three phases, and said attenuation coefficient of said measuring object is obtained by removing a sixth-order harmonic component of a frequency of said first AC voltage of said measuring object.

7. The power conversion control device according to claim 6, wherein said attenuation coefficient solution circuit includes:

a peak value detection circuit that detects a pair of local maximum values of said measuring object; and an attenuation coefficient calculation circuit that performs calculations to obtain a logarithmic decrement of said measuring object from an integer and a ratio of said pair of local maximum values and obtain said attenuation coefficient from said logarithmic decrement, said integer being larger by 1 than the number of other local maximum values between said pair of local maximum values.

* * * * *